(12) United States Patent
Van Den Brand et al.

(10) Patent No.: US 11,383,553 B2
(45) Date of Patent: Jul. 12, 2022

(54) TRANSMISSION ELEMENT FOR THE TRANSMISSION OF TORQUE FROM A CHAIN WHEEL TO A WHEEL HUB

(71) Applicant: Advancing Technologies B.V., Eindhoven (NL)

(72) Inventors: Johannes Gijsbertus Antonius Van Den Brand, Eindhoven (NL); Roëll Marie Van Druten, Eindhoven (NL)

(73) Assignee: ADVANCING TECHNOLOGIES B.V., Eindhoven (NL)

( * ) Notice: Subject to any disclaimer, the term of this patent is extended or adjusted under 35 U.S.C. 154(b) by 171 days.

(21) Appl. No.: 15/756,096

(22) PCT Filed: Aug. 29, 2016

(86) PCT No.: PCT/NL2016/050603
§ 371 (c)(1),
(2) Date: Feb. 28, 2018

(87) PCT Pub. No.: WO2017/039442
PCT Pub. Date: Mar. 9, 2017

(65) Prior Publication Data
US 2019/0023069 A1    Jan. 24, 2019

(30) Foreign Application Priority Data

Aug. 28, 2015  (NL) ................................. NL2015368

(51) Int. Cl.
*B62M 9/10* (2006.01)
*B60B 27/02* (2006.01)
(Continued)

(52) U.S. Cl.
CPC ............ *B60B 27/023* (2013.01); *B60B 27/04* (2013.01); *B62M 9/10* (2013.01); *B62M 11/14* (2013.01); *F16H 37/02* (2013.01)

(58) Field of Classification Search
CPC ....... B62M 9/10; B62M 11/14; B60B 27/023; B60B 27/04
See application file for complete search history.

(56) References Cited

U.S. PATENT DOCUMENTS

| | | |
|---|---|---|
| 2,731,857 A | 1/1956 | Marino |
| 3,513,725 A | 5/1970 | Shimano et al. |

(Continued)

FOREIGN PATENT DOCUMENTS

| | | |
|---|---|---|
| CN | 202464082 U | 10/2012 |
| DE | 9408910 U1 | 7/1994 |

(Continued)

OTHER PUBLICATIONS

International Preliminary Report on Patentability dated Mar. 6, 2018 issued in corresponding International Patent Application No. PCT/NL2016/050603 (6 pgs.).

(Continued)

*Primary Examiner* — Erin D Bishop
(74) *Attorney, Agent, or Firm* — Pillsbury Winthrop Shaw Pittman, LLP

(57) ABSTRACT

A transmission element for transferring torque from a set of sprockets to a bicycle rear wheel hub bearing-supported on a wheel axle is equipped with a first interface for coupling to the sprocket. This first interface is arranged such that it secures the sprocket or the cassette to the driver in axial and/or radial and/or tangential direction. The driver is furthermore equipped with a second interface for coupling to the sprocket. The second interface is arranged such that it secures the sprocket to the driver in axial and/or radial and/or tangential direction. The second interface is then present in a larger diameter than the first interface.

17 Claims, 4 Drawing Sheets

(51) Int. Cl.
  *B62M 11/14*  (2006.01)
  *B60B 27/04*  (2006.01)
  *F16H 37/02*  (2006.01)

(56) References Cited

U.S. PATENT DOCUMENTS

| | | | |
|---|---|---|---|
| 4,294,138 | A | 10/1981 | Fukui |
| 4,400,999 | A | 8/1983 | Steuer |
| 5,562,563 | A | 10/1996 | Shoge |
| 5,863,270 | A | 1/1999 | Chen et al. |
| 6,258,005 | B1 | 7/2001 | Rohloff |
| 6,428,437 | B1 | 8/2002 | Schlanger |
| 6,478,711 | B2 | 11/2002 | Yoo |
| 8,052,568 | B2 | 11/2011 | Hino |
| 8,992,375 | B2 | 3/2015 | Gobel et al. |
| 9,180,930 | B2 | 11/2015 | Bettin |
| 9,688,352 | B2 | 6/2017 | Taitt et al. |
| 10,041,567 | B2 | 8/2018 | Liu |
| 2009/0042682 | A1 | 2/2009 | Dal Pra' et al. |
| 2012/0244976 | A1 | 9/2012 | Lin |
| 2016/0305496 | A1 | 10/2016 | Liu |
| 2016/0362160 | A1 | 12/2016 | Van Druten et al. |

FOREIGN PATENT DOCUMENTS

| | | | |
|---|---|---|---|
| EP | 1074462 | A2 | 2/2001 |
| EP | 1431172 | A2 | 6/2004 |
| EP | 1666349 | A1 | 6/2006 |
| EP | 1972539 | A2 | 9/2008 |
| EP | 2022713 | A2 | 2/2009 |
| JP | 47-4013 | | 2/1972 |
| JP | 56-60786 | A | 5/1981 |
| JP | H06-64581 | A | 3/1993 |
| JP | H06-64581 | A | 3/1994 |
| JP | 2009-078799 | A | 4/2009 |

OTHER PUBLICATIONS

Written Opinion of the International Searching Authority dated Mar. 13, 2017 issued in corresponding International Patent Application No. PCT/NL2016/050603 (5 pgs.).
International Search Report PCT/NL2016/050603 dated Mar. 13, 2017.
First Office Action dated Sep. 4, 2019 issued in corresponding Chinese Patent Application No. 201680061733.3 with English translation (18 pgs.).
Office Action dated Sep. 23, 2020 issued in corresponding Japanese Patent Application No. 2018-530474 with English translation.
Examination Report dated Jun. 25, 2020 issued in corresponding EP Application No. 16 809 194.0 (5 pgs.).
Examination Report dated Nov. 19, 2020 issued in corresponding Indian Patent Application No. 201837008598 (6 pgs.).
Office Action dated Aug. 24, 2021, issued in corresponding Japanese Patent Application No. 2018-530474 with English translation (5 pgs.).
Notice of Reasons for Refusal dated Sep. 21, 2021 issued in corresponding Japanese Patent Application No. 2018-530473, with English translation (4 pgs.).

TRANSMISSION ELEMENT FOR THE TRANSMISSION OF TORQUE FROM A CHAIN WHEEL TO A WHEEL HUB

CROSS-REFERENCE TO RELATED APPLICATIONS

This is the U.S. National Stage of PCT/NL2016/050603, filed Aug. 29, 2016, Which in turn claims priority to: Netherlands Application No. 2015368, filed Aug. 28, 2015, the contents of each of these applications being incorporated herein by reference in their entireties.

FIELD OF THE INVENTION

The invention relates to a transmission element (driver) for transferring torque from a sprocket, which forms part of a set of sprockets (cassette), to a wheel hub bearing-supported on a wheel axle of a rear wheel of a bicycle, which transmission element (driver) is equipped with a first adapter for coupling to the wheel hub and a first interface for coupling to the sprocket, the first interface being arranged such that it secures the sprocket or the cassette to the driver in axial and/or radial and/or tangential direction, or that the first interface is arranged such that the sprocket or the set of sprockets is supported on the transmission element in axial and/or radial and/or tangential direction. The adapter in conjunction with a coupling part that is present in or on the wheel hub forms the coupling between these two parts and the interface in conjunction with a coupling part that is present in or on the sprocket forms the coupling between these two parts. In the set of sprockets (cassette) the sprockets may be attached to each other or connected to each other via a sprocket carrier. The bicycle may also be equipped with various sub-sets of sprockets which are present on the transmission element.

State of the Art

A transmission element (driver) of this type is generally known.

SUMMARY OF THE INVENTION

It is an object of the invention to provide a transmission element (driver) of the type defined in the opening paragraph to which sprockets may be attached in a better manner. To this end the driver according to the invention is characterized in that the driver is furthermore equipped with a second interface for coupling to the sprocket, where the second interface is arranged such that it secures the sprocket to the driver in axial and/or radial and/or tangential direction and where the second interface is present in a larger diameter than the first interface, which is meant to be understood that the distance from the second interface to the axis of the wheel axle is larger than the distance from the first interface to the axis of the wheel axle.

An embodiment of the driver according to the invention is characterized in that the driver is furthermore equipped with a third interface for coupling to the sprocket (or set of sprockets), which third interface is arranged such that it secures the sprocket to the driver in axial and/or radial and/or tangential direction, where the third interface is present in a larger diameter than the second interface.

A further embodiment of the driver according to the invention is characterized in that the first and/or second interface can secure/support the sprocket in axial direction.

Still a further embodiment of the driver according to the invention is characterized in that only the second interface can secure/support the sprocket in axial direction.

Preferably, the diameter in which the second interface is present is at least 5 mm larger than the diameter in which the first interface is present.

Furthermore, the diameter in which the second or third interface is present is preferably 10 mm larger than the diameter in which the first interface is present.

Again a further embodiment of the driver according to the invention is characterized in that the first and the second interface secure a first sub-set of various sprockets to the driver and in that the second and the third interface secure a second sub-set of various sprockets to the driver.

The driver is preferably provided with internal thread for cooperation with a lock nut.

Furthermore, the driver preferably includes a transmission which is present between the adapter and the interface or interfaces. This transmission is preferably formed by a planetary gear set comprising at least three rotational members, of which a first rotational member is connected to the interface or interfaces, a second rotational member is connected to the adapter and a third rotational member can be coupled to the wheel axle.

The invention also relates to a set of sprockets (sprocket carrier/cassette) to be applied to a driver according to the invention. With respect to this cassette the invention is characterized in that the cassette is equipped with a first and a second further interface which are coupled to the first and second interface respectively of the driver.

An embodiment of the cassette according to the invention is characterized in that the two further interfaces are present in the cassette in different diameters. A further embodiment of the cassette according to the invention is characterized in that the cassette is enclosed relative to the driver in axial direction by means of the first and/or second interface and the first and/or second further interface cooperating therewith.

A still further embodiment of the cassette according to the invention is characterized in that the cassette is enclosed in axial direction relative to the driver by means of the second interface and the second further interface cooperating therewith, while the lock nut provides the axial pressure force.

Again a further embodiment of the cassette according to the invention is characterized in that the cassette is equipped with a third further interface which positions the cassette on the driver in axial and/or radial and/or tangential direction.

A further embodiment of the cassette according to the invention is characterized in that the three further interfaces are present in the cassette in different diameters Preferably, the diameter in which the second further interface is present is at least 5 mm larger than the diameter in which the first further interface is present.

Furthermore, the diameter in which the second or third further interface is present is preferably 10 mm larger than the diameter in which the first further interface is present.

Yet a further embodiment of the cassette according to the invention is characterized in that the cassette comprises at least two sub-sets of sprockets, which are connected to each other after being mounted to the driver.

BRIEF DESCRIPTION OF THE DRAWINGS

The invention will be described below in more detail based on examples of embodiment of the driver and the set of sprockets (cassette) according to the invention represented in the drawing figures, in which.

DETAILED DESCRIPTION OF THE DRAWINGS

Figure 1:
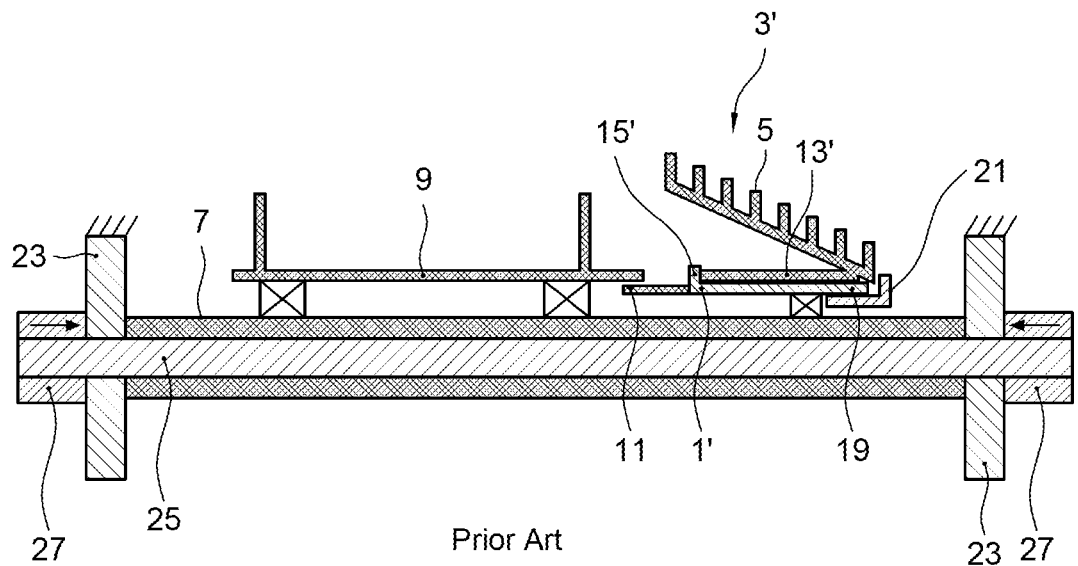
FIG. 1 gives a diagrammatic representation of a rear wheel construction showing a known driver.

FIG. 1 gives a diagrammatic representation of a rear wheel construction showing a known driver 1' for transferring torque from a sprocket 5, which forms part of a set of sprockets 3', to a wheel hub 9 bearing-supported on a wheel axle 7 of a rear wheel of a bicycle. The known driver 1' is equipped with an adapter 11 for coupling to the wheel hub and a first and a second interface 13' and 15' for coupling to the set 3'. The interfaces are arranged such that they secure the set of sprockets (cassette) to the driver in axial and/or radial and/or tangential direction. A pin 25 is inserted through the wheel axle, which pin together with two axial tabs 27 locks the wheel axle 7 in dropouts 23 of the bicycle frame. A lock nut 21 is turned into internal thread in the driver 1' and locks the set 3' of sprockets in axial direction between the second interface 15' and the lock nut.

The invention relates to a driver (formed by a sleeve) and various sprockets put together into a cassette. The sleeve (transmission housing) comprises at least three interfaces which provide the intake of the sprockets. Besides, the driver is threaded and a lock nut is present by which all sprockets can be secured together.

The three interfaces are all present in a different diameter from the driver, where the first interface is present in the smallest diameter and the third interface is present in the largest diameter. The second interface is present as regards diameter in between the first and the third interface.

The second interface is provided with an axial tab at which the sprockets can be pre-tensioned by means of the lock nut. An advantage of the additional axial second interface according to the invention is that the power loop between lock nut and axial tab is shorter than when an axial tab would be used in the third interface. As a result of the shorter power loop over the smaller sprockets this locking is much more rigid and more defined.

If an axial tab were used in the first interface it would not be possible (or would hardly be possible) to tension a cassette comprising two or more parts by means of the one lock nut.

In a preferred embodiment a transmission (gear system) is present under the cassette. The cassette comprises at least a single sprocket, but will preferably comprise a combination of various sprockets.

Figure 2:
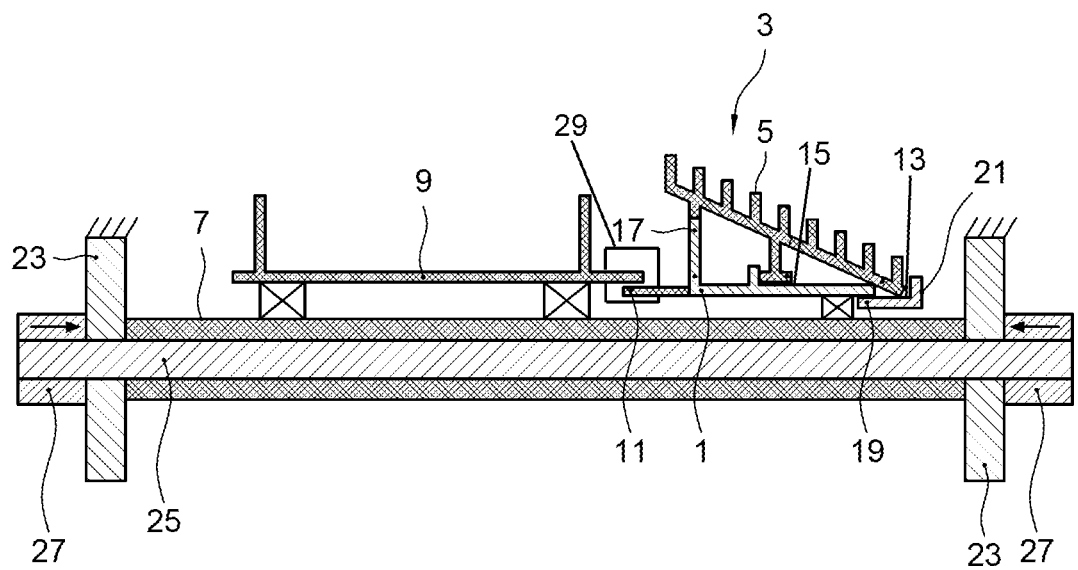
FIG. 2 gives a diagrammatic representation of a rear wheel construction via an embodiment of the driver according to the invention.
Figure 3:
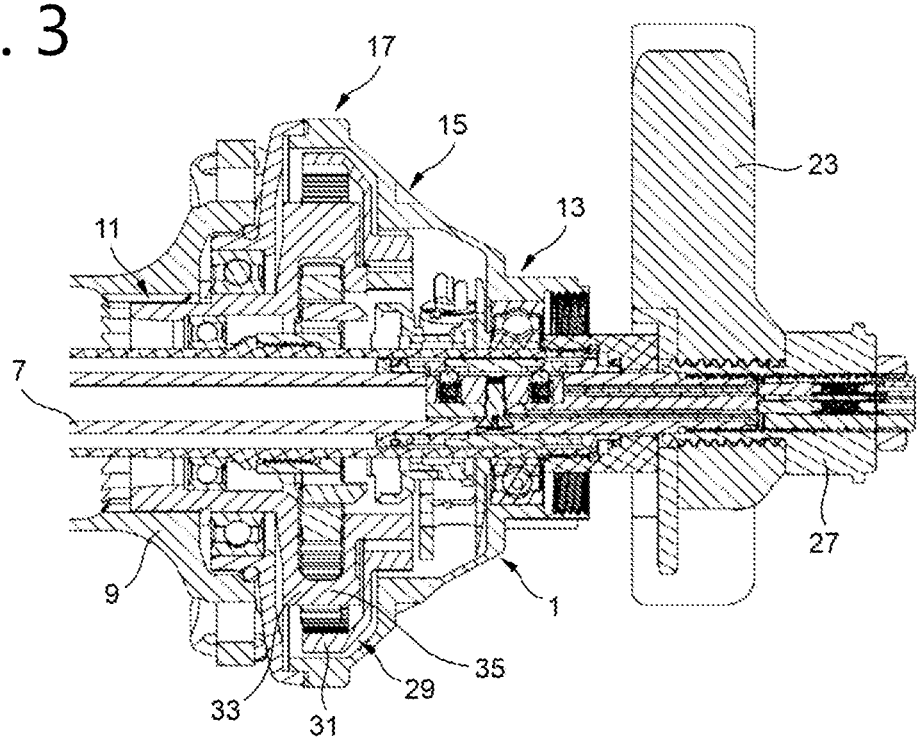
FIG. 3 gives a sectional representation of the driver of the rear wheel axle construction.

FIG. 2 and the following Figures give representations of an embodiment of the driver 1 according to the invention. The driver 1 comprises a second interface 15 for coupling to the sprocket 5. This second interface is arranged such that it secures the sprocket to the driver in axial and/or radial and/or tangential direction. The second interface 15 is then present in a larger diameter than the first interface 13.

The driver furthermore includes a third interface 17 for coupling to the sprocket 5, which third interface is arranged such that it secures the sprocket to the driver 1 in axial and/or radial and/or tangential direction, while the third interface is present in a larger diameter than the second interface 15. The second interface 15 secures/supports the sprocket 5 in axial direction.

The diameter in which the second interface 15 is present is at least 5 mm larger than the diameter in which the first interface 13 is present, and the diameter in which the second or third interface 15, 17 is present is at least 10 mm larger than the diameter in which the first interface 13 is present.

The first and the second interface 13, 15 secure a first sub-set (A) of various sprockets to the driver 1 and the second and the third interface 15, 17 secure a second sub-set (B) of various sprockets to the driver.

The driver 1 has internal thread 19 for cooperation with a lock nut 21. The driver 1 comprises a transmission 29 which is located between the adapter 11 and the interface or interfaces 13, 15, 17.

The transmission 29 is formed by a planetary gear set comprising at least three rotational members, of which a first rotational member 31 is connected to the interface or interfaces 13, 15, 17, a second rotational member 33 is connected to the adapter and a third rotational member 35 can be coupled to the wheel axle 7.

The cassette 3 comprises a first and a second further interface 37, 39 which are coupled to the first and second interface 13, 15 respectively of the driver, while the two further interfaces 37, 39 are present in different diameters in the cassette 3. In axial direction the cassette 3 is enclosed relative to the driver 1 by means of the first and/or second interface 13, 15 and the first and/or second further interface 37, 39 cooperating therewith.

In axial direction the cassette is enclosed relative to the driver by means of the second interface and the second further interface cooperating therewith, while the lock nut provides the axial pressure force. The cassette 3 comprises a third further interface 41 which positions the cassette on the driver 1 in axial and/or radial and/or tangential direction. The three further interfaces 37, 39, 41 are present in the cassette 3 in different diameters.

The diameter in which the second further interface 39 is present is at least 5 mm larger than the diameter in which the first further interface 37 is present. The diameter in which the second or third further interface 39, 41 is present is at least 10 mm larger than the diameter in which the first further interface 37 is present.

The cassette comprises at least two sub-sets (A, B) of sprockets 5 which, once mounted to the driver 1, are connected to each other.

Figure 4:
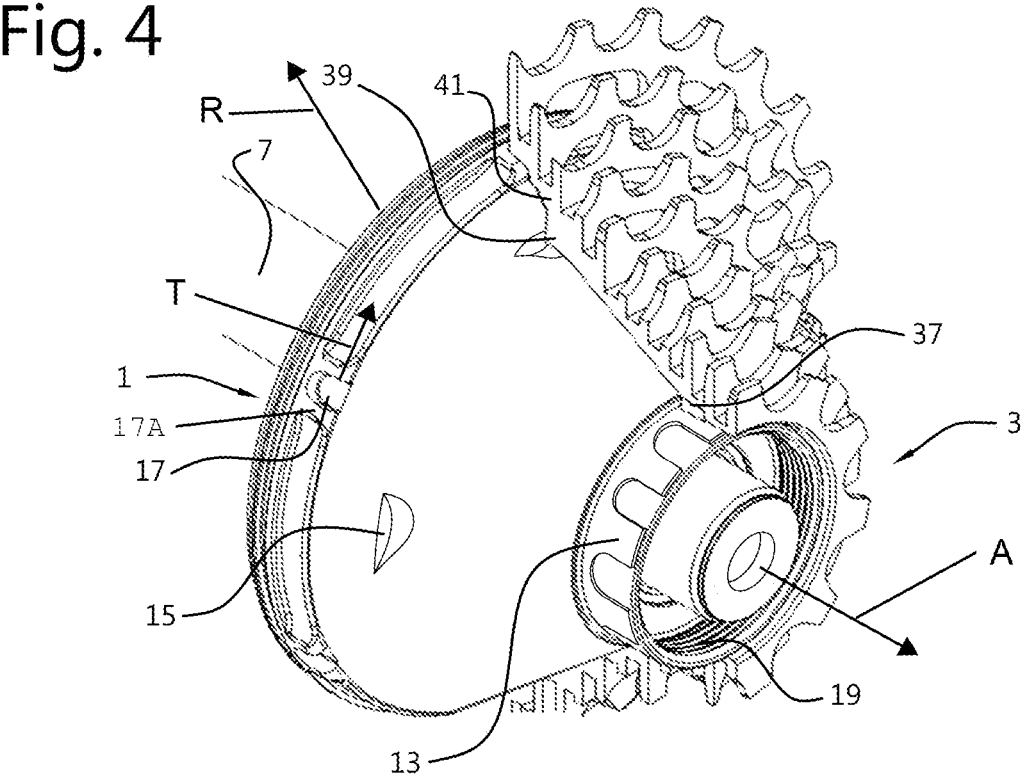
FIG. 4 gives a perspective view of the driver with the set of sprockets.

FIG. 4 shows the driver and cassette (road, one-piece, steel) in an isometric view. For ease of understanding the one-piece cassette is sliced to reveal the specific details on the connection with the driver.

The following table gives an overview of all interface directions (A, R, T). Please refer to the description of directions as indicated in FIG. 4.

| | Description | Axial (A) | Radial (R) | Tangential (T) |
|---|---|---|---|---|
| Interface #1 | Splined connection cassette and driver | No | Yes | Yes |

-continued

|  | Description | Axial (A) | Radial (R) | Tangential (T) |
|---|---|---|---|---|
| Interface #2 | Tab of cassette in axial indent of driver | Yes | Yes [1] | No |
| Interface #3 | Tab of cassette in indent of torque tab (17A) of driver | No | Yes | Yes |

[1] Radial alignment needed with composite cassette variants. Not needed with the single-piece (road) cassette: this would cause an over constraint.

Figure 5:
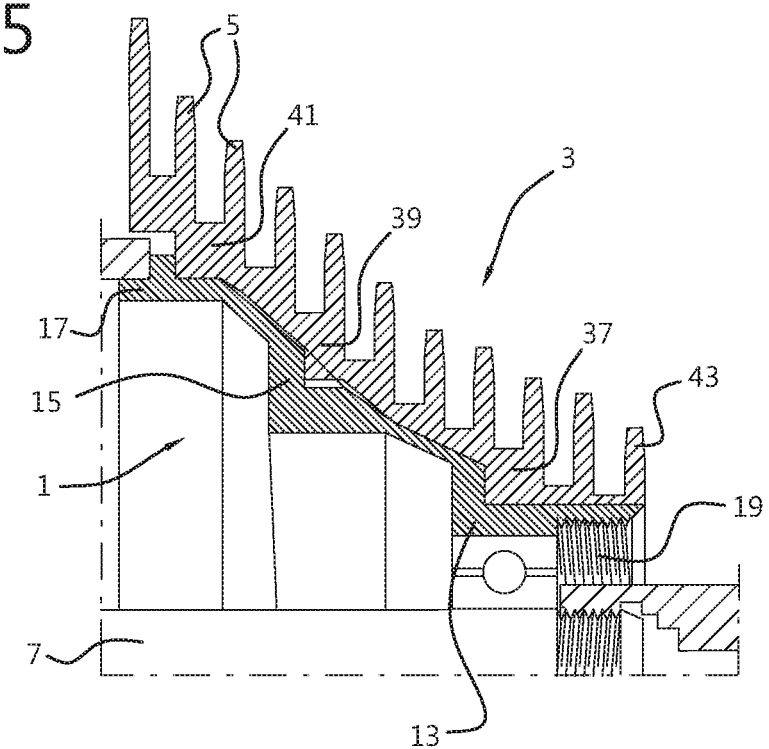
FIG. 5 gives a sectional view of the driver with the set of sprockets.

FIG. 5 Based on the interface outlining mentioned in previous table and figures, the cassette fitment to the driver as shown in FIG. 5 can be described as follows:

The cassette (one-piece body) is radially supported in Interface #1 and Interface #3;

The composite cassette is radially supported in Interface #1, Interface #2 and Interface #3;

At Interface #1 and Interface #3 the one-piece and composite cassette transfers torque to the driver;

The smallest sprocket—typically an 11t sprocket made as a separate part, not being part of the one-piece cassette body—is supported radially and transfers torque to the driver at Interface #1;

The smallest separate sprocket will be pressed axially to the cassette's (A/B) body by means of a lock ring, threaded into the internal threads of the driver;

The cassette body (A/B) is axially pressed via aforementioned separate sprocket to the axial faces at Interface #2

Figure 6:
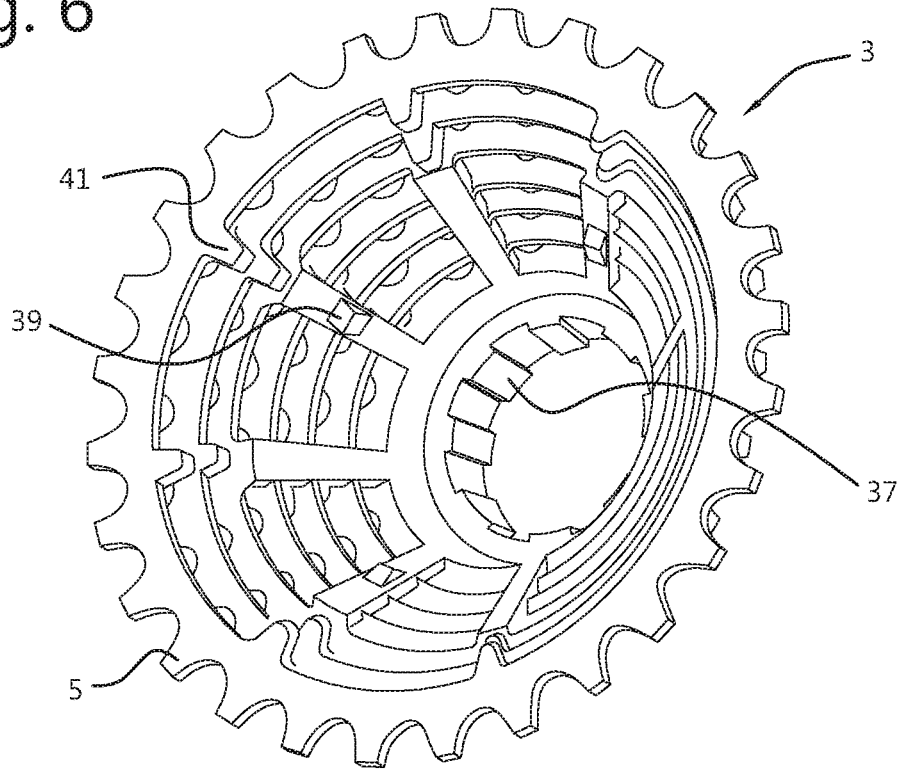
FIG. 6 gives a sectional view of the set of sprockets.

In FIG. 6 a road cassette is shown made as a one-piece assembly. The smallest cog can be separated but should have an equal spline profile on its inner diameter.

Figure 7:
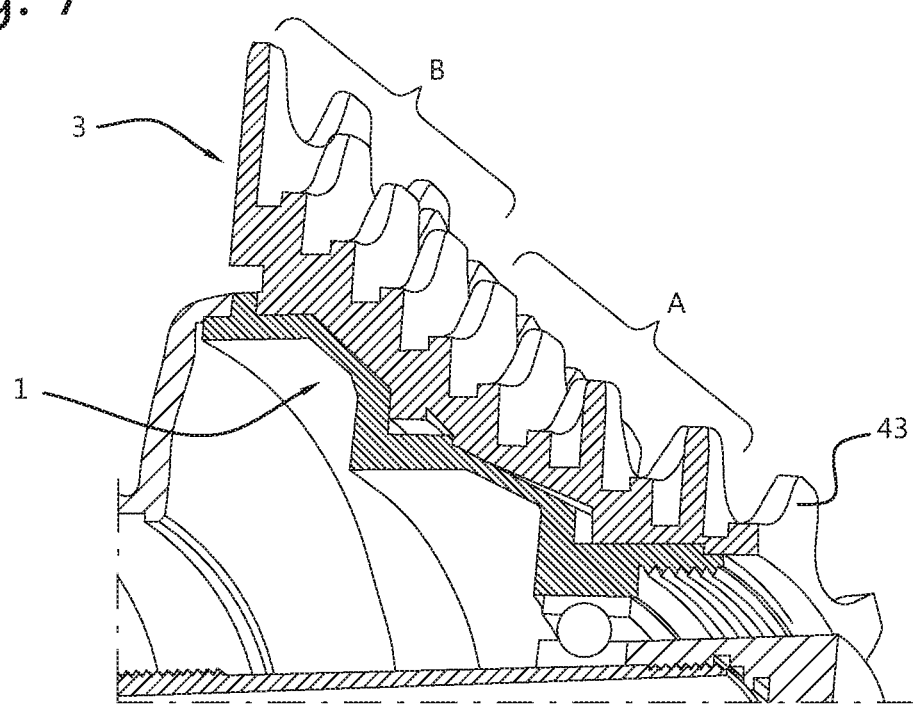
FIG. 7 gives a sectional view of the driver with two sub-sets of sprockets.
Figure 8:
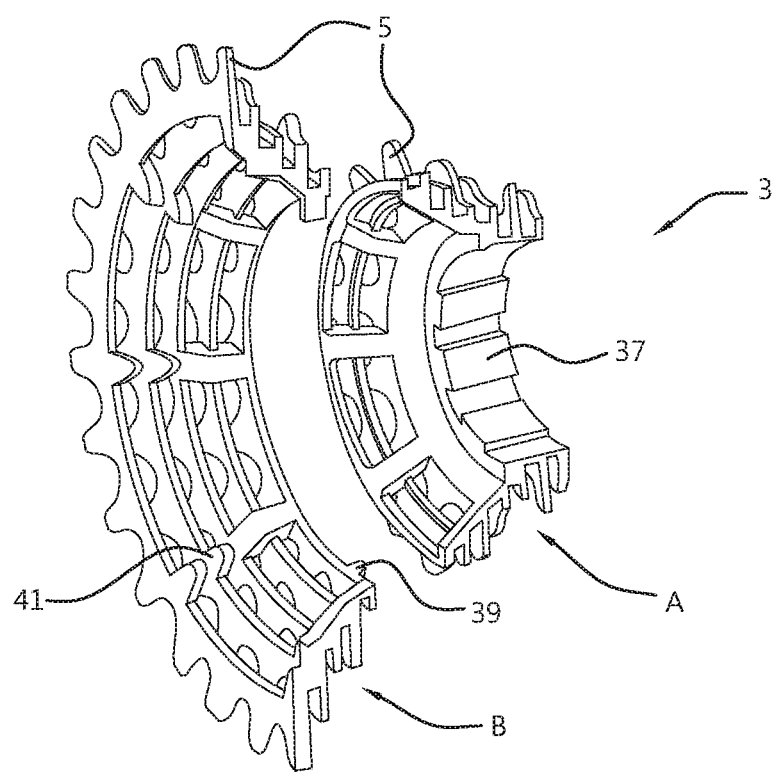
FIG. 8 gives a perspective view of the two sub-sets of sprockets.

The cassette design shown in FIGS. 7 and 8 is a proposal for a composite construction. The object of this composite construction is to create a lighter cassette.

Part (A) is made from steel (including the separated or integrated smallest sprocket). As the chain forces on the larger sprocket are lower in general, part (B) can be made from material that has a lower strength and weight than steel, such as titanium.

The proposed design is made such that first part (B) is mounted to the driver, followed by part (A) and the separated smallest sprocket (A'), if applicable. Part (B) will have the axial tabs which will effectively position the whole cassette in the axial direction.

Provisions need to be made to maintain proper rotational alignment (timing) between parts (A) and (B), however, no torque transfer through this alignment is needed.

Albeit the invention has been described in the foregoing based on the drawings, it should be observed that the invention is not by any manner or means restricted to the embodiments shown in the drawings. The invention also extends to all embodiments deviating from the embodiments shown in the drawings within the scope defined by the claims.

The invention claimed is:

1. A transmission driver for transferring torque from a plurality of sprockets unified in a cassette, to a wheel hub bearing-supported on a wheel axle of a rear wheel of a bicycle,
the driver being equipped with an adapter for coupling to the wheel hub and a first interface for coupling to the cassette,
the first interface being arranged such that it secures the cassette to the driver,
wherein the driver is further equipped with an additional interface for coupling to the cassette, wherein the additional interface includes recesses and protrusions of the driver configured such that said recesses and protrusions secures to protrusions and recesses respectively, of the cassette so as to transfer torque from the cassette to the driver, and wherein the additional interface is located at a relatively larger diameter of the driver than the first interface.

2. The driver as claimed in claim 1, wherein the driver is equipped with a second interface for coupling to the cassette, wherein the second interface is arranged such that it secures the cassette to the driver, and wherein the second interface is located at a relatively smaller diameter of the driver than the additional interface, and at a relatively larger diameter of the driver than the first interface.

3. The driver as claimed in claim 2, the diameter at which the second or additional interface is present is at least 10 mm larger than the diameter at which the first interface is present.

4. The driver as claimed in claim 2, wherein the first and the second interfaces secure a first sub-set of the plurality of sprockets to the driver and wherein the second and the additional interfaces secure a second sub-set of the plurality of sprockets to the driver.

5. The driver as claimed in claim 2, wherein the second interface is configured to secure the cassette in an axial direction.

6. The driver as claimed in claim 1, wherein the diameter at which the additional interface is present is at least 5 mm larger than the diameter at which the first interface is present.

7. The driver as claimed in claim 1, wherein the driver is provided with an internal thread for cooperation with a lock nut.

8. The driver as claimed in claim 1, wherein the driver comprises a transmission which is present between the adapter and one or more of the interfaces.

9. The driver as claimed in claim 8, wherein the transmission is formed by a planetary gear set comprising at least three rotational members, of which a first rotational member is connected to one or more of the interfaces, a second rotational member is connected to the adapter, and a third rotational member is coupled to the wheel axle.

10. The cassette comprising the plurality of sprockets configured to be applied to the driver as claimed in claim 1, wherein the cassette is equipped with a first further interface which is coupled to the first interface, of the driver, and wherein the cassette includes the protrusions and recesses configured to mesh with the protrusions and recesses of the driver.

11. The cassette as claimed in claim 10, wherein the first further interface and the protrusions and recesses are present at different diameters of the cassette.

12. The cassette as claimed in claim 11, wherein the diameter at which the additional further interface is located is at least 5 mm larger than the diameter at which the first further interface is located.

13. The cassette as claimed in claim 10, wherein the cassette is equipped with a second further interface which positions the cassette on the driver in an axial and/or a radial direction.

14. The cassette as claimed in claim 13, wherein each of the first, second, and additional further interfaces are present in the cassette at different diameters.

15. The cassette as claimed in claim 13, wherein the diameter at which the second further interface or the protrusions and recesses are present is at least 10 mm larger than the diameter at which the first further interface is present.

16. The cassette as claimed in claim 13, wherein the cassette is confined in the axial direction relative to the driver by means of the second further interface, wherein a lock nut provides an axial pressure force for confining the cassette in the axial direction.

17. The cassette as claimed in claim 10, wherein the plurality of sprockets comprises at least two sub-sets of sprockets which are connected to each other after being mounted to the driver.

* * * * *